United States Patent
Takeshige et al.

(10) Patent No.: US 12,528,573 B2
(45) Date of Patent: Jan. 20, 2026

(54) CONTROL DEVICE AND CONTROL METHOD

(71) Applicant: HONDA MOTOR CO., LTD., Tokyo (JP)

(72) Inventors: Takamasa Takeshige, Wako (JP); Toshiaki Tohoda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 504 days.

(21) Appl. No.: 18/125,846

(22) Filed: Mar. 24, 2023

(65) Prior Publication Data
US 2023/0312074 A1 Oct. 5, 2023

(30) Foreign Application Priority Data

Mar. 29, 2022 (JP) ................. 2022-054256

(51) Int. Cl.
 *B63H 21/21* (2006.01)
 *B63H 20/10* (2006.01)
(52) U.S. Cl.
 CPC ........... *B63H 21/213* (2013.01); *B63H 20/10* (2013.01); *B63H 2021/216* (2013.01)
(58) Field of Classification Search
 CPC . B63H 21/213; B63H 2021/216; B63H 20/10
 See application file for complete search history.

(56) References Cited

U.S. PATENT DOCUMENTS

| | | |
|---|---|---|
| 11,247,763 B2 | 2/2022 | Takano et al. |
| 2010/0250036 A1* | 9/2010 | Bamba ................. F02N 11/0803 440/1 |
| 2020/0039639 A1* | 2/2020 | Sinusas .................. B64D 43/00 |

FOREIGN PATENT DOCUMENTS

| | | | |
|---|---|---|---|
| EP | 1770007 A2 * | 4/2007 | ............. B63H 20/00 |
| JP | 2020-101125 A | 7/2020 | |

* cited by examiner

*Primary Examiner* — Stephen P Avila
(74) *Attorney, Agent, or Firm* — WHDA, LLP

(57) ABSTRACT

A control device for a vessel, the control device comprises: an operation monitoring unit configured to monitor presence or absence of a supply of first electric power supplied from a power supply to an operation display unit for operating the vessel; a drive monitoring unit configured to monitor presence or absence of a supply of second electric power supplied from the power supply to a drive source of the vessel; and a caution control unit configured to cause a caution output device to output a caution based on information indicating the presence or the absence of the supplies of the first electric power and the second electric power that have been respectively acquired from the operation monitoring unit and the drive monitoring unit.

11 Claims, 5 Drawing Sheets

CONTROL DEVICE AND CONTROL METHOD

CROSS-REFERENCE TO RELATED APPLICATION(S)

This application claims priority to and the benefit of Japanese Patent Application No. 2022-054256 filed on Mar. 29, 2022, the entire disclosure of which is incorporated herein by reference.

BACKGROUND OF THE INVENTION

Field of the Invention

The present invention relates to a control device and a control method for a vessel.

Description of the Related Art

Japanese Patent Laid-Open No. 2020-101125 discloses a control device for a vessel propulsion apparatus that starts or stops an engine provided in each of a plurality of propulsion apparatuses.

In a configuration of the control device, as to a configuration including a first switch for supplying electric power to an operation display device for operating the vessel and a second switch for supplying the electric power to a drive source of the vessel, when a vessel operator gets off the vessel, the vessel operator may forget to turn off either one of the switches and leave the vessel, in some cases. For example, in a case where the vessel operator turns off the second switch on the drive source side but forgets to turn off the first switch on the operation display device side that consumes a large amount of electric power, and gets off the vessel, battery consumption may occur, such as dead battery caused by continuation of a state in which the electric power is being supplied.

The present invention provides a technique for controlling a vessel to be capable of causing an output unit to output a caution, in a case where a first electric power is being supplied to an operation display device for operating the vessel and the supply of a second electric power to a drive source of the vessel is stopped.

SUMMARY OF THE INVENTION

According to one aspect of the present invention, there is provided a control device for a vessel, the control device comprising: an operation monitoring unit configured to monitor presence or absence of a supply of first electric power supplied from a power supply to an operation display unit for operating the vessel; a drive monitoring unit configured to monitor presence or absence of a supply of second electric power supplied from the power supply to a drive source of the vessel; and a caution control unit configured to cause a caution output device to output a caution, in a case where the first electric power is being supplied and the supply of the second electric power is stopped, based on information indicating the presence or the absence of the supplies of the first electric power and the second electric power that have been respectively acquired from the operation monitoring unit and the drive monitoring unit.

According to another aspect of the present invention, there is provided a control method in a control device for a vessel, the control method comprising: monitoring, by an operation monitoring unit, presence or absence of a supply of first electric power supplied from a power supply to an operation display unit for operating the vessel; monitoring, by a drive monitoring unit, presence or absence of a supply of second electric power supplied from the power supply to a drive source of the vessel; and causing, by a caution control unit, a caution output device to output a caution, in a case where the first electric power is being supplied and the supply of the second electric power is stopped, based on information indicating the presence or the absence of the supplies of the first electric power and the second electric power that have been respectively acquired from the operation monitoring unit and the drive monitoring unit.

DESCRIPTION OF THE EMBODIMENTS

Figure 1:
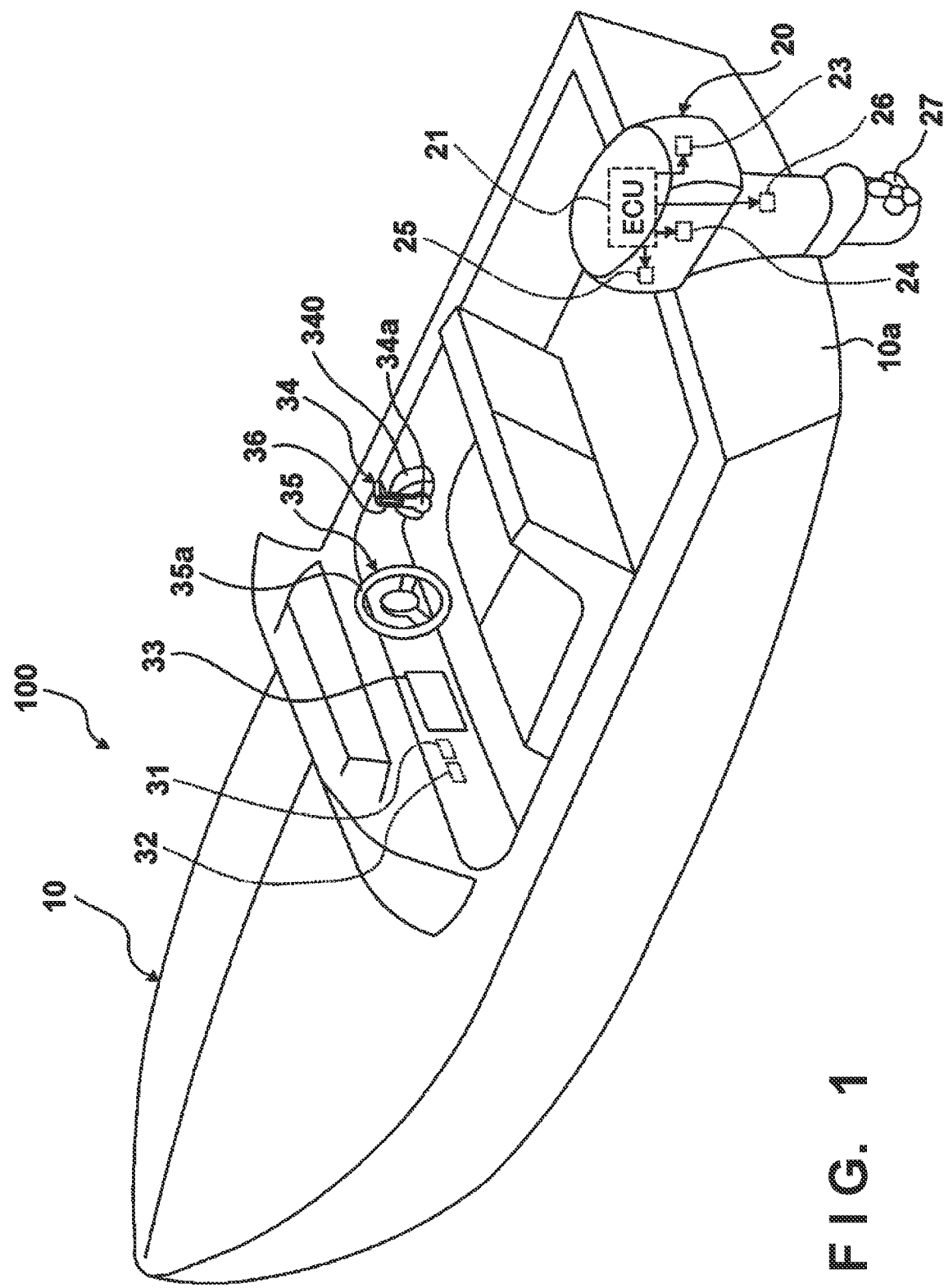
FIG. 1 is a schematic view illustrating an external configuration of a vessel including a control device for a propulsion apparatus according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Figure 2:
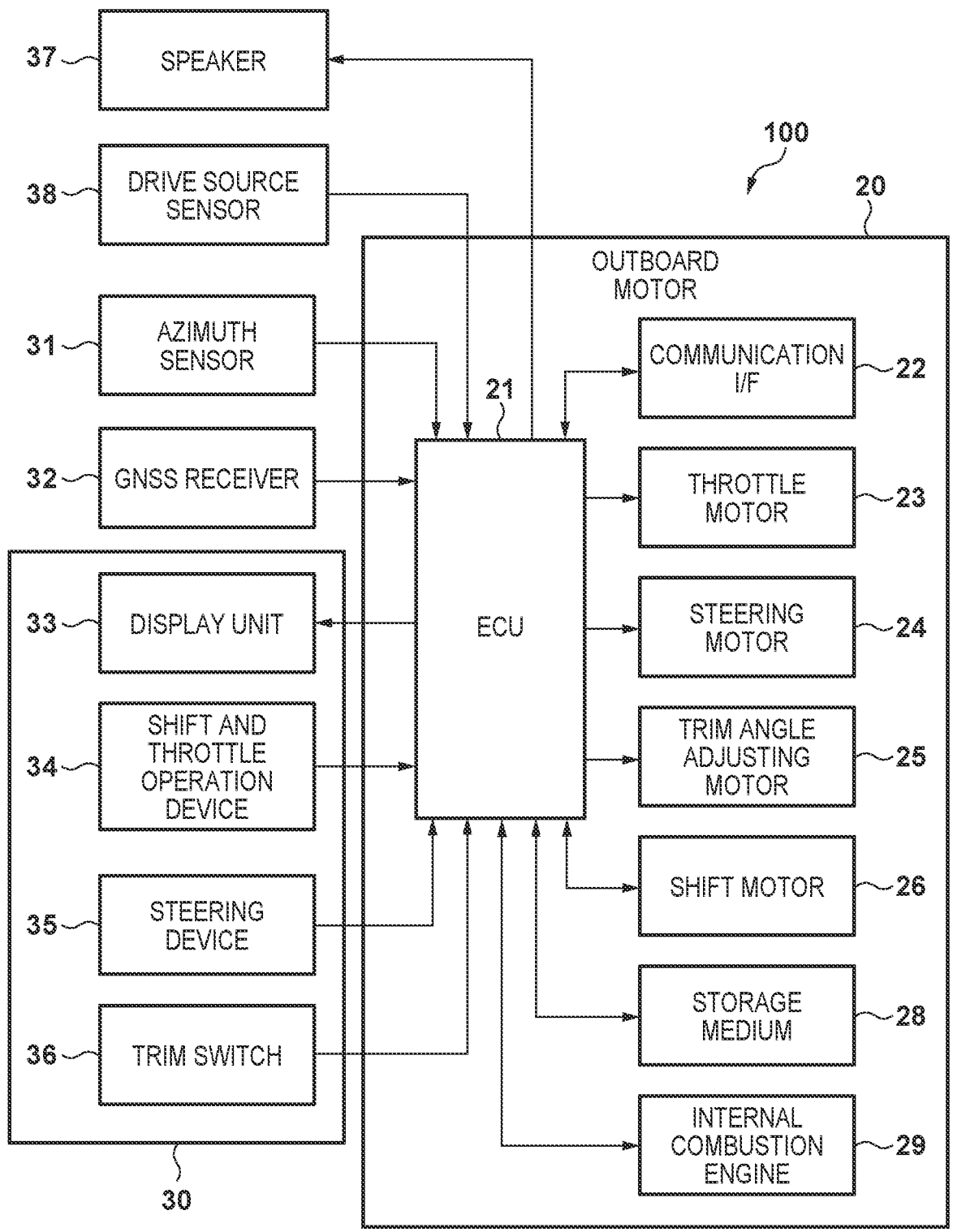
FIG. 2 is a diagram illustrating a configuration of main components of the vessel.

FIG. 1 is a schematic diagram illustrating an external configuration of a vessel 100 including an electronic control unit (ECU), which is an embodiment of a control device. FIG. 2 is a block diagram illustrating a configuration of main components of hardware of the vessel 100 illustrated in FIG. 1.

The vessel 100 includes a hull 10, an outboard motor 20 as a propulsion apparatus attached to a stern 10a of the hull 10, an azimuth sensor 31 provided on the hull 10, a global navigation satellite system (GNSS) receiver 32, a display unit 33 including a liquid crystal display device and the like, a shift and throttle operation device 34, a steering device 35, a trim switch 36, a speaker 37, and a drive source sensor 38.

The speaker 37 outputs a predetermined caution, based on a caution output instruction that has been transmitted from an ECU 21 (control device). The magnitude of a caution sound and the timing of a caution output are controllable, based on the caution output instruction that has been transmitted from the ECU 21.

The drive source sensor 38 detects whether a drive source (internal combustion engine 29) is working or stopped, and outputs the detected information to the ECU 21.

The azimuth sensor 31 detects an azimuth to which the bow of the hull 10 is oriented, and outputs a signal indicating the azimuth.

The GNSS receiver 32 (signal receiver) detects position information of the vessel (hull 10), based on a GNSS signal that has been received from a GNSS satellite, and outputs a signal indicating the position information.

The outboard motor 20 includes the ECU 21, an internal combustion engine 29, a propeller 27 to be rotated by dynamic power from the internal combustion engine 29, a throttle motor 23, a steering motor 24, a trim angle adjusting motor 25, and a shift motor 26.

The throttle motor 23 is an actuator for opening and closing a throttle valve of the internal combustion engine 29.

The steering motor 24 is an actuator for driving a steering mechanism that causes the outboard motor 20 to rotate around the vertical axis so as to change the orientation of the outboard motor 20 with respect to a direction connecting the bow of the hull 10 and the stern 10a.

The trim angle adjusting motor 25 is an actuator for driving a trim angle adjusting mechanism that adjusts a trim angle of the outboard motor 20 with respect to the hull 10.

The shift motor 26 is an actuator for driving a shift mechanism that switches the rotation direction of the propeller 27 between positive and opposite directions.

The ECU 21 is configured to be communicable with the azimuth sensor 31, the GNSS receiver 32, the display unit 33, the shift and throttle operation device 34, the steering device 35, and the trim switch 36 on wired communication or wireless communication.

In the present embodiment, the display unit 33, the shift and throttle operation device 34, the steering device 35, and the trim switch 36 will be collectively referred to as an operation display device 30.

The ECU 21 is connected with the azimuth sensor 31, the GNSS receiver 32, the display unit 33, the shift and throttle operation device 34, the steering device 35, and the trim switch 36 through, for example, a controller area network (CAN) as a communication system.

The shift and throttle operation device 34 includes a rotation shaft, the illustration of which is omitted, and which is rotatably supported inside a remote control box 340 disposed in the vicinity of the cockpit, a shift and throttle lever 34a, which is attached to such a rotation shaft, and which is capable of swingably operating in a front-and-rear direction from an initial position, and a lever position sensor, the illustration of which is omitted, and which is disposed inside the remote control box 340.

The lever position sensor detects an operation position of the shift and throttle lever 34a (a rotation angle of the rotation shaft of the shift and throttle operation device 34) by a vessel operator, and outputs a signal corresponding to the operation position. A signal that has been output from the lever position sensor is transmitted to the ECU 21.

Upon receipt of the signal corresponding to the rotation angle of the rotation shaft of the shift and throttle operation device 34, the ECU 21 controls the throttle motor 23 so that a throttle valve opening has a value corresponding to such a rotation angle. As the rotation angle of the rotation shaft of the shift and throttle operation device 34 increases, the throttle valve opening is controlled to increase, and the rotation speed of the propeller 27 increases.

A sign of the rotation angle of the rotation shaft of the shift and throttle operation device 34 (a rotation direction of the shift and throttle lever 34a) and a rotation direction of the propeller 27 are managed in association with each other.

For example, the rotation angle with a plus sign is associated with a positive direction as the rotation direction of the propeller 27, and the rotation angle with a minus sign is associated with an opposite direction as the rotation direction of the propeller 27. When the propeller 27 rotates in the positive direction, the hull 10 moves forward, and when the propeller 27 rotates in the opposite direction, the hull 10 moves backward.

Upon receipt of a signal corresponding to the rotation angle of the rotation shaft of the shift and throttle operation device 34, the ECU 21 controls the shift motor 26 so that the rotation direction of the propeller 27 corresponds to the rotation direction of the rotation shaft.

The shift and throttle operation device 34 functions as an operation unit for instructing each the rotation speed of the propeller 27 included in the outboard motor 20 and the rotation direction of the propeller 27.

The shift and throttle operation device 34 is capable of instructing the rotation speed and the rotation direction of the propeller with use of a single device. However, an operation unit for instructing the rotation speed of the propeller 27 and an operation unit for instructing the rotation direction of the propeller 27 may be individually provided.

The steering device 35 functions as an operation unit for instructing a posture of the outboard motor 20 (orientation of the outboard motor 20 to be determined by the rotation angle around the vertical axis). The steering device 35 includes a steering wheel 35a configured to be rotatable around the shaft as a rotation axis, and a steering angle sensor provided in the vicinity of such a shaft so as to detect a steering angle of the steering wheel 35a and output a signal corresponding to the steering angle. The signal corresponding to the steering angle output from the steering angle sensor is transmitted to the ECU 21.

The steering angle of the steering wheel 35a and the rotation angle of the outboard motor 20 around the vertical axis are managed in association with each other. Upon receipt of the signal corresponding to the steering angle of the steering wheel 35a, the ECU 21 controls the steering motor 24 so that the rotation angle of the outboard motor 20 becomes a rotation angle corresponding to the steering angle.

The trim switch 36 functions as an operation unit for instructing a posture (trim angle) of the outboard motor 20. The trim switch 36 includes a movable member that is movable forward and backward from an initial position, and a position sensor that detects a position of the movable member and outputs a signal corresponding to the position. The signal corresponding to the position of the movable member output from the position sensor is transmitted to the ECU 21.

While receiving, from the trim switch 36, a signal indicating that the position of the movable member is on a front side relative to the initial position, the ECU 2.1 controls the trim angle adjusting motor 25 to increase the trim angle by a predetermined amount.

While receiving, from the trim switch 36, a signal indicating that the position of the movable member is on a rear side relative to the initial position, the ECU 21 controls the trim angle adjusting motor 25 to reduce the trim angle by a predetermined amount.

A communication I/F 22 (communication unit) is an interface for communicating with an electronic device such as a smartphone connectable to a mobile telephone network, an interface for directly connecting to the mobile telephone network, or the like.

A storage medium 28 is for storing information of a specific water area necessary for navigation of the vessel 100 and various programs necessary for control of the vessel 100, and includes a semiconductor memory such as a flash memory, for example. The storage medium 28 may be of a portable type attachable to or detachable from the outboard motor 20.

Figure 3:
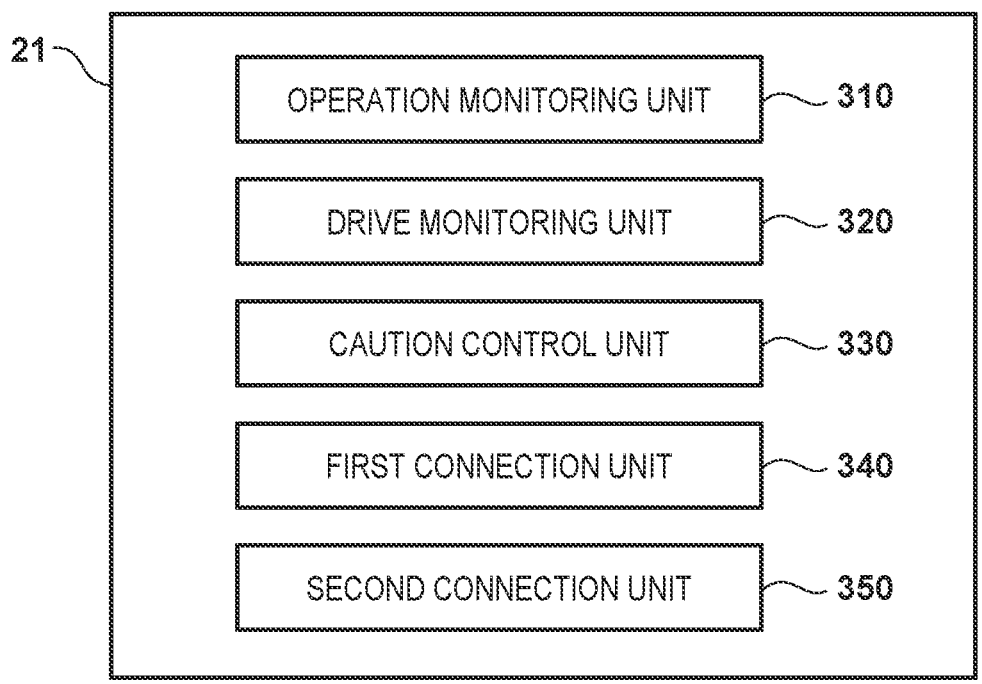
FIG. 3 is a diagram illustrating a functional configuration of a control device (ECU)

The ECU 21 is configured with a microcomputer including a processor, a read only memory (ROM), a random access memory (RAM), and the like. FIG. 3 is a block diagram illustrating a functional configuration of the ECU 21 illustrated in FIG. 2.

Figure 4:
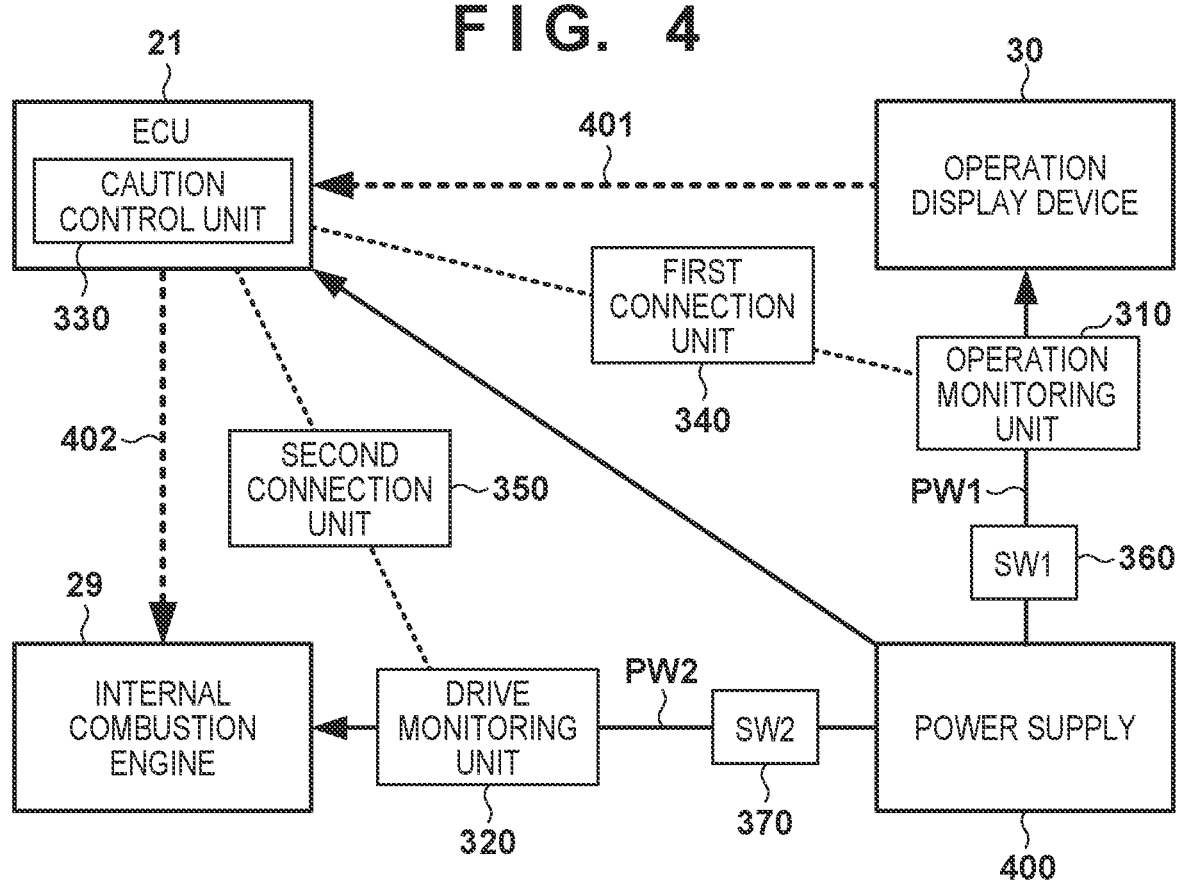
FIG. 4 is a diagram for schematically describing connections of a power supply, and the ECU, an internal combustion engine, and an operation device.

The processor executes a program stored in the ROM included in the ECU 21, and the ECU 21 cooperates with various types of hardware of the outboard motor 20 and the vessel 100 so as to function as an operation monitoring unit 310, a drive monitoring unit 320, a caution control unit 330, a first connection unit 340, and a second connection unit 350. In addition, FIG. 4 is a diagram for schematically describing respective connections of a power supply 400 of the vessel 100, and the ECU 21, the internal combustion engine 29, and the operation display device 30.

The power supply 400 is connected with the ECU 21, the operation display device 30, and the internal combustion engine 29, and is capable of supplying predetermined electric power. When a first key, not illustrated, is operated and a first switch 360 (SW1) is switched from OFF state to ON state, first electric power PW1 is supplied from the power supply 400 to the operation display device 30. When a second key, not illustrated, is operated and a second switch 370 (SW2) is switched from OFF state to ON state, second electric power PW2 is supplied from the power supply 400 to the internal combustion engine 29.

Then, when an operation by the vessel operator (user) is input, the operation display device 30 outputs an operation signal 401 to the ECU 21. The ECU 21 outputs a signal 402 based on the operation signal 401 to the internal combustion engine 29. In a case where the operation signal 401 is a signal for stopping the vessel 100, the signal 402 serves as a signal for stopping an output from the internal combustion engine. In a case where the operation signal 401 is a signal for propelling the vessel 100, the signal 402 serves as a signal for driving the internal combustion engine 29. The caution control unit 330 acquires the signal 402 as information indicating a working state of the internal combustion engine 29, and is capable of determining the working state of the internal combustion engine 29, based on the signal 402.

The operation monitoring unit 310 monitors the presence or absence of the first electric power PW1 supplied from the power supply 400 to the operation display device 30 for operating the vessel 100.

The drive monitoring unit 320 monitors the presence or absence of the second electric power PW2 supplied from the power supply 400 to the drive source (internal combustion engine 29) of the vessel 100.

In a case where the first electric power PW1 is being supplied and the supply of the second electric power PW2 is stopped, based on the information indicating the presence or absence of the supply of the electric power that has been acquired from the operation monitoring unit 310 and the drive monitoring unit 320, the caution control unit 330 causes an output unit (the speaker 37, hereinafter, also referred to as a caution output device) to output a caution.

The first connection unit 340 is configured to be capable of switching a connection state between the operation monitoring unit 310 and the caution control unit 330 (ECU 21) to a non-connection state, based on a control signal from the caution control unit 330. In addition, the second connection unit 350 is configured to be capable of switching a connection state between the drive monitoring unit 320 and the caution control unit 330 (ECU 21) to a non-connection state, based on a control signal from the caution control unit 330.

Here, when the drive source (internal combustion engine 29) is in a working state, based on a detection output from the drive source sensor 38, the caution control unit 330 generates a control signal to set the connection state between the ECU 21 (control device) and the operation monitoring unit 310 and the connection state between the ECU 21 (control device) and the drive monitoring unit 320 to a non-connection state. While the drive source (internal combustion engine 29) is working, in a case where the connection state of the cable for supplying the electric power from the power supply 400 is unstable, a surge voltage may act on a connection cable for connecting the drive monitoring unit 320 and the ECU 21, and may damage the ECU 21. In order to prevent such a case beforehand, while the drive source (internal combustion engine 29) is working, the caution control unit 330 generates a control signal to set the connection state between the ECU 21 (control device) and the drive monitoring unit 320 to the non-connection state. Similarly, in order to prevent the case where the surge voltage acts on a connection cable for connecting the operation monitoring unit 310 and the ECU 21, and damage the ECU 21, the caution control unit 330 generates a control signal to set the connection state between the ECU 21 (control device) and the operation monitoring unit 310 to the non-connection state, while the drive source (internal combustion engine 29) is working.

The caution output is enabled while the drive source (internal combustion engine 29) stops working. While the drive source (internal combustion engine 29) stops working, and in a case where the first electric power PW1 is being supplied and the supply of the second electric power PW2 is stopped, based on the information indicating the presence or absence of the supply of the electric power that has been acquired from the operation monitoring unit 310 and the drive monitoring unit 320 in the connection state, the caution control unit 330 causes the output unit (speaker 37) to output a caution.

Figure 5:
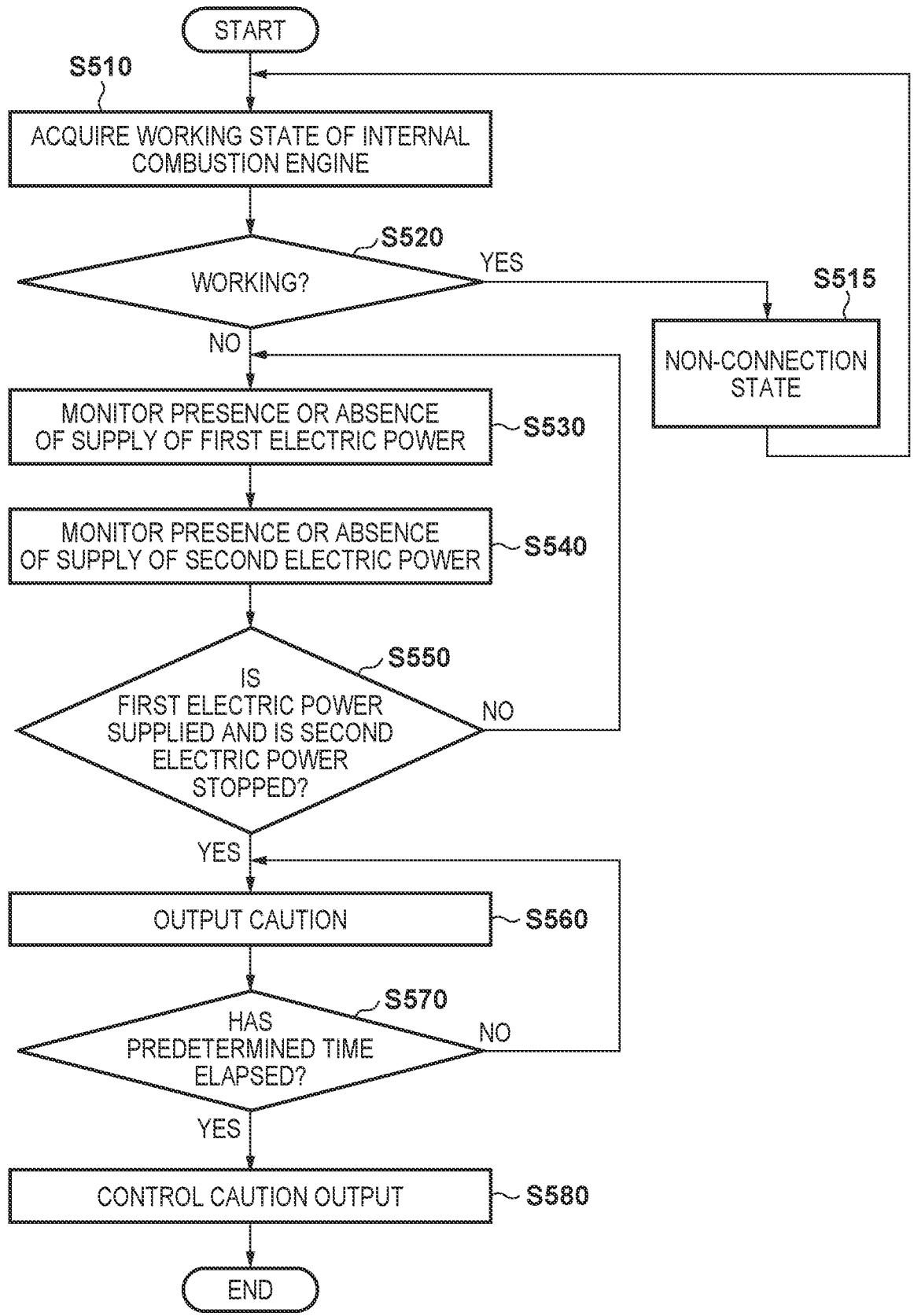
FIG. 5 is a flowchart for describing working of the control device.

FIG. 5 is a flowchart for describing working of the ECU 21 illustrated in FIG. 2. In step S510, the caution control unit 330 acquires information indicating a working state of the drive source (internal combustion engine 29) from a detection output from the drive source sensor 38. Note that regarding the working state of the drive source (internal combustion engine 29), without depending on the detection output from the drive source sensor 38, the caution control unit 330 is also capable of acquiring the signal 402, which is being output from the ECU 21 to the internal combustion engine 29, as information indicating the working state of the internal combustion engine 29, and determining the working state of the internal combustion engine 29, based on the signal 402.

In step S520, the caution control unit 330 determines whether the internal combustion engine 29 is working, based on the information indicating the working state that has been acquired, and in a case where the internal combustion engine is working (S520-YES), the processing proceeds to step S515.

In step S515, the caution control unit 330 generates a control signal to set the connection state between the ECU 21 (control device) and the drive monitoring unit 320 to the non-connection state so as not to be affected by the surge voltage. Similarly, the caution control unit 330 generates a control signal to set the connection state between the ECU 21 (control device) and the operation monitoring unit 310 to the non-connection state. Then, the processing returns to step S510, and similar processing is repeated.

On the other hand, in a case where while the internal combustion engine 29 stops working in step S520 (S520-NO), the processing proceeds to step S530.

In step S530, the operation monitoring unit 310 monitors the presence or absence of the first electric power PW1 supplied from the power supply 400 to the operation display device 30 for operating the vessel 100.

In step S540, the drive monitoring unit 320 monitors the presence or absence of the second electric power PW2 supplied from the power supply 400 to the drive source (internal combustion engine 29) of the vessel 100.

In step S550, the caution control unit 330 determines whether a condition for outputting a caution is satisfied, based on the information indicating the presence or absence of the supply of the electric power that has been acquired from the operation monitoring unit 310 and the drive monitoring unit 320. In the determination in step S550, in a case where the condition for outputting the caution is not satisfied (S550-NO), the processing returns to step S530, and similar processing is repeated.

On the other hand, in the determination in step S550, in a case where the first electric power PW1 is being supplied and the supply of the second electric power PW2 is stopped, based on the information indicating the presence or absence of the supply of the electric power that has been acquired from the operation monitoring unit 310 and the drive monitoring unit 320, the caution control unit 330 causes the output unit (speaker 37) to output a caution.

In step S560, the speaker 37 outputs a predetermined caution, based on a caution output instruction that has been transmitted from the caution control unit 330 of the ECU 21.

In step S570, the caution control unit 330 counts a predetermined time from the start of the caution output from the output unit (speaker 37). In a case where the predetermined time has not elapsed (S570-NO), the processing returns to step S560, and the output unit (speaker 37) continues outputting the predetermined caution, based on the caution output instruction that has been transmitted from the caution control unit 330 of the ECU 21.

On the other hand, in a case where it is determined in step S570 that the predetermined time has elapsed (S570-YES), the caution control unit 330 advances the processing to step S580.

In step S580, the caution control unit 330 controls the caution output from the output unit (speaker 37). As a control example of the caution output, for example, after a predetermined time has elapsed from the start of the caution output from the output unit (speaker 37), the caution control unit 330 increases the caution sound from the output unit (speaker 37).

Alternatively, after a predetermined time has elapsed from the start of the caution output from the output unit (speaker 37), the caution control unit 330 is also capable of transmitting a caution instruction for outputting a caution via the communication I/F 22 (communication unit) to a portable communication device of the vessel operator (user) so as to cause the portable communication device to output the caution.

In addition, after a predetermined time has elapsed from the start of the caution output from the output unit (speaker 37), the caution control unit is also capable of controlling the operation monitoring unit 310 to automatically cut off the supply of the first electric power PW1 supplied from the power supply 400.

Alternatively, in automatically cutting off the supply of the first electric power PW1, it is also possible to set the position information of the vessel, as a condition for cutting off the supply of the electric power. For example, in a case where the vessel that satisfies the condition of S550 in FIG. 5 is located in a sea area other than mooring places, there may a case where it is necessary to ensure the electric power of the operation display device 30 for a rescue operation. For this reason, there may be a preferable case of limiting the caution output to a case where the vessel is located at a mooring place registered beforehand.

In this case, the GNSS receiver 32 (signal receiver) detects the position information of the vessel (hull 10), based on the GNSS signal that has been received from the GNSS satellite, and the caution control unit 330 determines whether the vessel is located at the mooring place where the position information of the vessel has been registered beforehand, and uses a determination result for controlling the caution output. For example, in a state in which the position information indicates that the vessel is located at the mooring place registered beforehand and after a predetermined time has elapsed from the start of the caution output, the caution control unit 330 is also capable of controlling the operation monitoring unit 310 to cut off the supply of the first electric power PW1 supplied from the power supply 400.

First Modification

In the processing flow of FIG. 5, the description has been given with regard to the configuration in which the caution output from the output unit (speaker 37) is controlled after the predetermined time has elapsed. However, it is also possible to control the caution to be output from a portable communication device, when a relative distance between the position information of the vessel and the portable communication device of the vessel operator (user) such as a smartphone exceeds a threshold distance.

Figure 6:
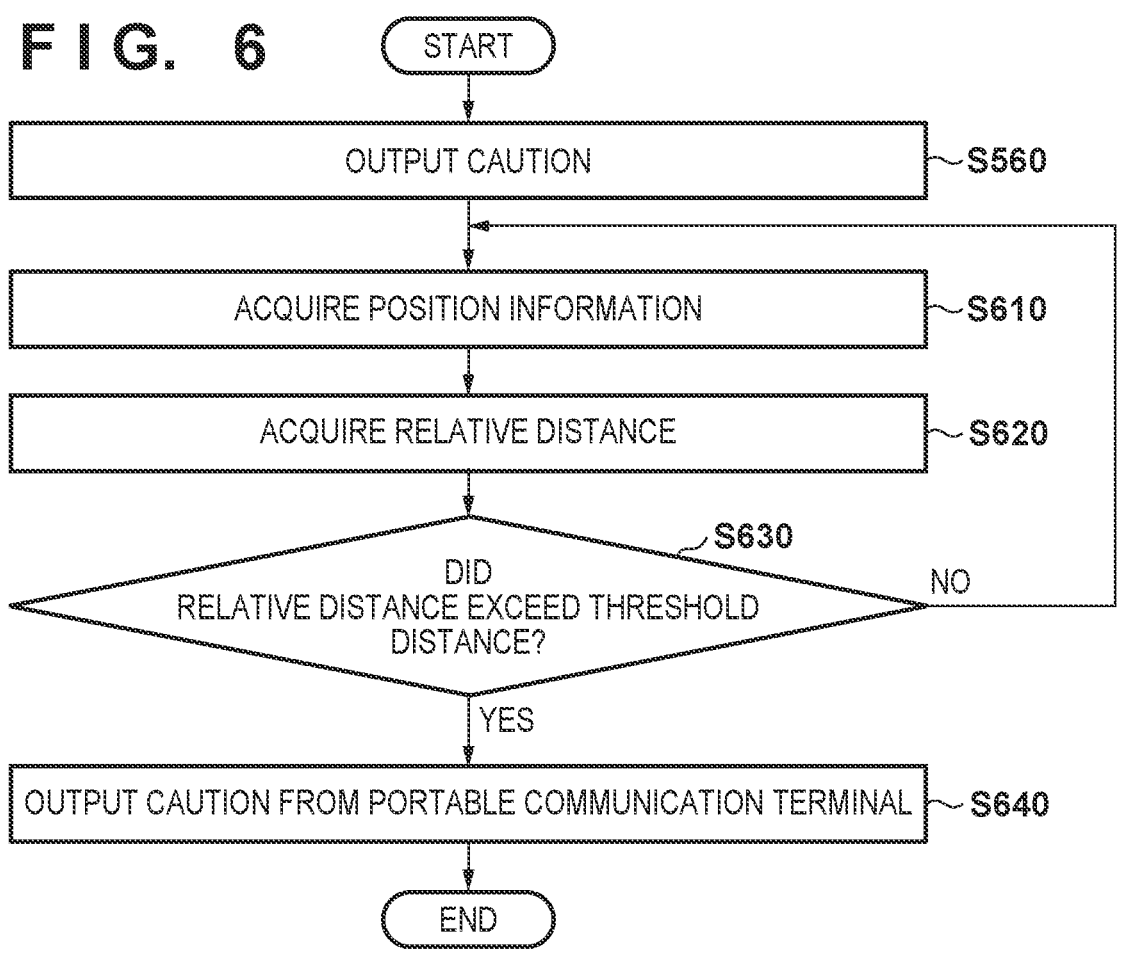
FIG. 6 is a flowchart for describing working of the control device, in a first modification.

FIG. 6 is a flowchart for describing working of the ECU 21 in a first modification. Step S560 is similar to the processing described in S560 of FIG. 5, and the speaker 37 outputs a predetermined caution, based on the caution output instruction that has been transmitted from the caution control unit 330 of the ECU 21.

In step S610, the GNSS receiver 32 (signal receiver) detects the position information of the vessel (hull 10), based on the GNSS signal that has been received from the GNSS satellite, and outputs a signal indicating the position information.

In step S620, the communication I/F 22 (communication unit) acquires the relative distance between the portable communication device and the vessel (hull 10) by communication with the portable communication device.

In step S630, the caution control unit 330 determines whether the relative distance exceeds the threshold distance, and in a case where the relative distance does not exceed the threshold distance (S630-NO), the processing returns to step S610, and the similar processing is repeated. On the other hand, in the determination in S630, in a case where the relative distance exceeds the threshold distance (S630-YES), the processing proceeds to step S640.

In step S640, the caution control unit 330 transmits a caution instruction for outputting a caution to the portable communication device of the vessel operator (user) via the communication I/F 22 (communication unit), and causes the portable communication device to output a caution.

Second Modification

While the caution is being output from the speaker 37, by operating the first switch 360 (SW1) from ON state to OFF state on the vessel (hull 10) side, the vessel operator (user) is able to stop the caution. On the other hand, while the caution is being output from a portable terminal device, the vessel operator (user) is away from the vessel. Hence, there may be a case where it is difficult for the vessel operator (user) to operate the first switch 360 (SW1) on the vessel (hull 10) side.

Figure 7:
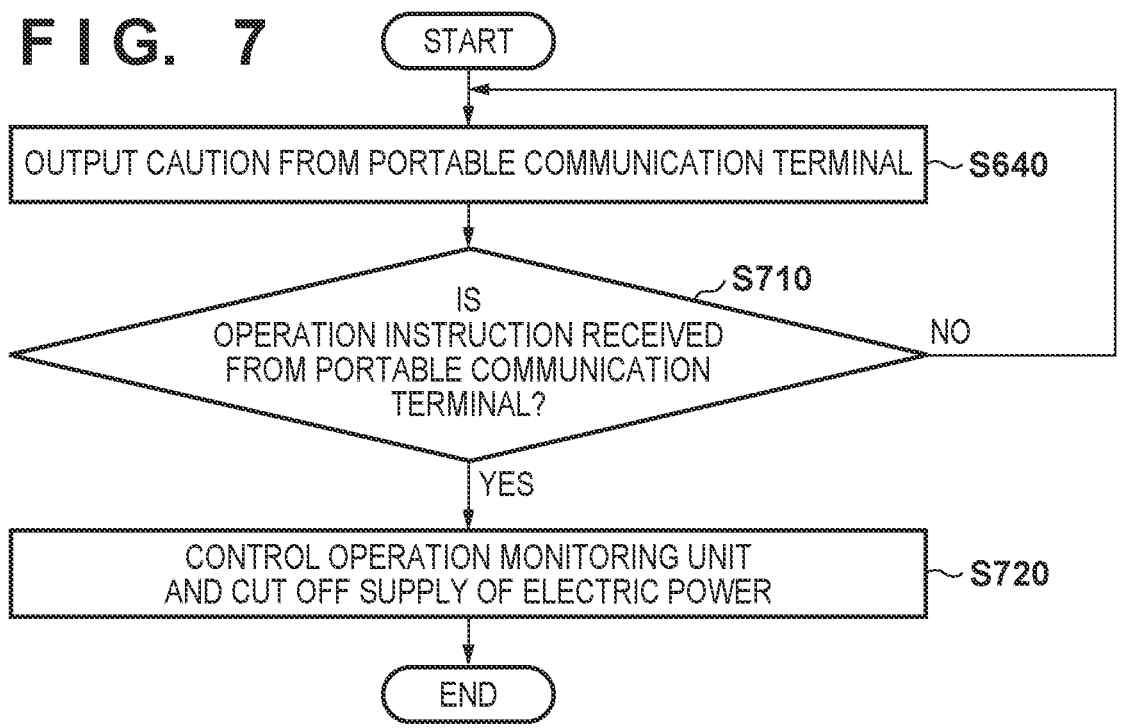
FIG. 7 is a flowchart for describing working of the control device, in a second modification.

From the viewpoint of user convenience, it is desirable if it is possible to stop the caution from the portable terminal device. In a second modification, a flow of processing for stopping the caution from the portable terminal device will be described. Here, FIG. 7 is a flowchart for describing working of the ECU 21 in the second modification.

Step S640 is similar to the processing described in S640 of FIG. 6, and the caution control unit 330 transmits a caution instruction for outputting a caution to the portable communication device of the vessel operator (user) via the communication I/F 22 (communication unit), and causes the portable communication device to output the caution.

In step S710, the caution control unit 330 determines whether an operation instruction from the portable communication device has been received via the communication I/F 22 (communication unit). In a case where the operation instruction from the portable communication device has not been received (S710-NO), the processing returns to step S640, and the similar processing is repeated. On the other hand, in the determination of step S710, in a case where the operation instruction from the portable communication device has been received (S710-YES), the processing proceeds to step S720.

In step S720, the caution control unit 330 controls the operation monitoring unit 310, based on the operation instruction from the portable communication device, and cuts off the supply of the first electric power PW1 supplied from the power supply 400.

Note that in the processing of FIG. 7, the description has been given with regard to a processing example of cutting off the supply of the first electric power PW1, based on the operation instruction from the portable communication device, in the case where the relative distance exceeds the threshold distance. However, the present invention is not limited to such a processing example.

For example, even in a case where the operation instruction from the portable communication device has not been received, the condition of the lapse of the predetermined time and the condition of the relative distance that exceeds the threshold distance may be combined as a condition for cutting off the supply of the electric power. In this case, when a predetermined time has elapsed from the start of the caution output from the output unit (speaker 37), and in a case where they are apart from each other such that the relative distance exceeds the predetermined threshold distance, the caution control unit 330 is also capable of controlling the operation monitoring unit 310 to cut off the supply of the first electric power PW1 supplied from the power supply 400.

SUMMARY OF EMBODIMENTS

The above embodiment discloses at least the following control device and control method.

Configuration 1. A control device (21) for a vessel (100), the control device comprises:
an operation monitoring unit (310) configured to monitor presence or absence of a supply of first electric power supplied from a power supply to an operation display unit for operating the vessel;
a drive monitoring unit (320) configured to monitor presence or absence of a supply of second electric power supplied from the power supply to a drive source of the vessel; and
a caution control unit (330) configured to cause a caution output device to output a caution, in a case where the first electric power is being supplied and the supply of the second electric power is stopped, based on information indicating the presence or the absence of the supplies of the first electric power and the second electric power that have been respectively acquired from the operation monitoring unit and the drive monitoring unit.

According to the control device in the configuration 1, it becomes possible to output a caution from the output unit, in a case where the first electric power is being supplied to the operation display device for operating the vessel and the supply of the second electric power to the drive source of the vessel is stopped. Accordingly, it is possible to prevent the consumption of the battery due to continuation of the state in which the first electric power is being supplied.

Configuration 2. The control device further comprises:
a detection unit (38) configured to detect a working state of the drive source;
a first connection unit (340) configured to be capable of switching a connection state between the operation monitoring unit and the control device to a non-connection state, based on a control signal from the caution control unit; and
a second connection unit (350) configured to be capable of switching a connection state between the drive monitoring unit and the control device to the non-connection state, based on a control signal from the caution control unit,
wherein while the drive source is in the working state, the caution control unit generates the control signal based on a detection output from the detection unit, and sets the connection state between the control device and the operation monitoring unit and the connection state between the control device and the drive monitoring unit to the non-connection state.

According to the control device in the configuration 2, the control device (ECU) can be prevented beforehand from being damaged by a surge voltage acting on a connection cable.

Configuration 3. While the drive source stops working,
in a state in which the first electric power is being supplied, and in a state in which the supply of the second electric power is stopped, based on the information indicating the presence or the absence of the supplies of the first electric power and the second electric power that have been respectively acquired from the operation monitoring unit and the drive monitoring unit that are in the connection state, the caution control unit causes the caution output device to output the caution.

According to the control device in the configuration 3, in a case where the first electric power is being supplied to the operation display device for operating the vessel and the supply of the second electric power to the drive source of the vessel is stopped, it becomes possible to output a caution from the output unit without being affected by the surge voltage.

Configuration 4. After a predetermined time has elapsed from a start of an output of the caution from the caution output device, the caution control unit increases a caution sound from the caution output device.

According to the control device in the configuration 4, the vessel operator can easily hear the caution sound, and when the vessel operator is not on the vessel, the continuation of the state in which the first electric power is being supplied can be informed in a more reliable manner.

Configuration 5. After the predetermined time has elapsed from the start of the output of the caution from the caution output device, the caution control unit transmits a caution instruction for outputting the caution to a portable communication device via a communication unit, and causes the portable communication device to output the caution.

Configuration 6. The control device further comprises:
 a signal reception unit (32) configured to detect position information of the vessel, based on a global navigation satellite system (GNSS) signal, and to output a signal indicating the position information; and
 a communication unit (22) configured to acquire a relative distance between a portable communication device and the vessel by communication with the portable communication device,
 wherein in a case where the portable communication device and the vessel are apart from each other such that the relative distance exceeds a predetermined threshold distance, the caution control unit (330) transmits a caution instruction for outputting the caution to the portable communication device via the communication unit, and causes the portable communication device to output the caution.

According to the control device in the configuration 5 and the configuration 6, even when the vessel operator who has got off the vessel leaves the vessel, the caution is caused to output from the portable communication device of the vessel operator, so that the continuation of the state in which the first electric power is being supplied can be informed.

Configuration 7. The caution control unit (330) acquires an operation instruction from the portable communication device by communication via the communication unit, and controls the operation monitoring unit to cut off the supply of the first electric power supplied from the power supply, based on the operation instruction.

According to the control device in the configuration 7, even when the vessel operator who has got off the vessel leaves the vessel, the supply of the first electric power can be cut off from the portable communication device of the vessel operator.

Configuration 8. After the predetermined time has elapsed from the start of the output of the caution from the caution output device, the caution control unit (330) controls the operation monitoring unit to cut off the supply of the first electric power supplied from the power supply.

According to the control device in the configuration 8, even when the vessel operator who has got off the vessel leaves the vessel, the supply of the first electric power can be automatically cut off, on condition that the predetermined time has elapsed.

Configuration 9. In a state in which the position information of the vessel is located in a mooring place registered beforehand, and after the predetermined time has elapsed from the start of the output of the caution, the caution control unit (330) controls the operation monitoring unit to cut off the supply of the first electric power supplied from the power supply.

According to the control device in the configuration 9, a caution can be output, only in a case where the vessel is located at a mooring place registered beforehand. Accordingly, for example, in a case where the vessel that satisfies the condition for outputting the caution is located in a sea area other than mooring places, it is possible to ensure the electric power of the operation display device necessary for the rescue operation or the like.

Configuration 10. In a case where a predetermined time has elapsed from the start of the output of the caution from the caution output device and the relative distance exceeds the predetermined threshold distance, the caution control unit controls the operation monitoring unit to cut off the supply of the first electric power supplied from the power supply.

According to the control device in the configuration 10, even though the operation instruction from the portable communication device has not been received, the supply of the first electric power can be automatically cut off, when a combination of the condition of the lapse of the predetermined time and the condition of the relative distance exceeding the threshold distance is satisfied, as the condition for cutting off the power supply.

Configuration 11. A control method in a control device for a vessel, the control method comprises:
 Monitoring (S530), by an operation monitoring unit (310), presence or absence of a supply of first electric power supplied from a power supply to an operation display unit for operating the vessel;
 Monitoring (S540), by a drive monitoring unit (320), presence or absence of a supply of second electric power supplied from the power supply to a drive source of the vessel; and
 Causing (S560), by a caution control unit (330), a caution output device to output a caution, in a case where the first electric power is being supplied and the supply of the second electric power is stopped, based on information indicating the presence or the absence of the supplies of the first electric power and the second electric power that have been respectively acquired from the operation monitoring unit and the drive monitoring unit.

According to the control method in the configuration 11, in a state in which the first electric power is being supplied to the operation display device for operating the vessel and the supply of the second electric power to the drive source of the vessel is stopped, it becomes possible to output the caution from the output unit. Accordingly, it is possible to prevent the consumption of the battery due to continuation of the state in which the first electric power is being supplied.

Other Embodiments

In the present invention, it is also possible to supply a program for achieving the functions of the above-described embodiments to a system or a control device constituting the system via a network or a storage medium, and one or more processors on a computer of the control device are capable of reading the program and executing processing of the control device.

The invention is not limited to the foregoing embodiments, and various variations/changes are possible within the spirit of the invention.

What is claimed is:

1. A control device for a vessel, the control device comprising:
    an operation monitoring unit configured to monitor presence or absence of a supply of first electric power supplied from a power supply to an operation display unit for operating the vessel;
    a drive monitoring unit configured to monitor presence or absence of a supply of second electric power supplied from the power supply to a drive source of the vessel; and
    a caution control unit configured to cause a caution output device to output a caution, in a case where the first electric power is being supplied and the supply of the second electric power is stopped, based on information indicating the presence or the absence of the supplies of the first electric power and the second electric power that have been respectively acquired from the operation monitoring unit and the drive monitoring unit.

2. The control device according to claim 1, further comprising:
    a detection unit configured to detect a working state of the drive source;
    a first connection unit configured to be capable of switching a connection state between the operation monitoring unit and the control device to a non-connection state, based on a control signal from the caution control unit; and
    a second connection unit configured to be capable of switching a connection state between the drive monitoring unit and the control device to the non-connection state, based on a control signal from the caution control unit,
    wherein while the drive source is in the working state, the caution control unit generates the control signal based on a detection output from the detection unit, and sets the connection state between the control device and the operation monitoring unit and the connection state between the control device and the drive monitoring unit to the non-connection state.

3. The control device according to claim 2, wherein while the drive source stops working,
    in a state in which the first electric power is being supplied, and in a state in which the supply of the second electric power is stopped, based on the information indicating the presence or the absence of the supplies of the first electric power and the second electric power that have been respectively acquired from the operation monitoring unit and the drive monitoring unit that are in the connection state, the caution control unit causes the caution output device to output the caution.

4. The control device according to claim 1, wherein after a predetermined time has elapsed from a start of an output of the caution from the caution output device, the caution control unit increases a caution sound from the caution output device.

5. The control device according to claim 4, wherein after the predetermined time has elapsed from the start of the output of the caution from the caution output device, the caution control unit transmits a caution instruction for outputting the caution to a portable communication device via a communication unit, and causes the portable communication device to output the caution.

6. The control device according to claim 1, further comprising:
    a signal reception unit configured to detect position information of the vessel, based on a global navigation satellite system (GNSS) signal, and to output a signal indicating the position information; and
    a communication unit configured to acquire a relative distance between a portable communication device and the vessel by communication with the portable communication device,
    wherein in a case where the portable communication device and the vessel are apart from each other such that the relative distance exceeds a predetermined threshold distance, the caution control unit transmits a caution instruction for outputting the caution to the portable communication device via the communication unit, and causes the portable communication device to output the caution.

7. The control device according to claim 5, wherein the caution control unit acquires an operation instruction from the portable communication device by communication via the communication unit, and
    controls the operation monitoring unit to cut off the supply of the first electric power supplied from the power supply, based on the operation instruction.

8. The control device according to claim 4, wherein after the predetermined time has elapsed from the start of the output of the caution from the caution output device, the caution control unit controls the operation monitoring unit to cut off the supply of the first electric power supplied from the power supply.

9. The control device according to claim 6, wherein in a state in which the position information of the vessel is located in a mooring place registered beforehand, and after the predetermined time has elapsed from the start of the output of the caution, the caution control unit controls the operation monitoring unit to cut off the supply of the first electric power supplied from the power supply.

10. The control device according to claim 6, wherein in a case where a predetermined time has elapsed from the start of the output of the caution from the caution output device and the relative distance exceeds the predetermined threshold distance, the caution control unit controls the operation monitoring unit to cut off the supply of the first electric power supplied from the power supply.

11. A control method in a control device for a vessel, the control method comprising:
    monitoring, by an operation monitoring unit, presence or absence of a supply of first electric power supplied from a power supply to an operation display unit for operating the vessel;
    monitoring, by a drive monitoring unit, presence or absence of a supply of second electric power supplied from the power supply to a drive source of the vessel; and
    causing, by a caution control unit, a caution output device to output a caution, in a case where the first electric power is being supplied and the supply of the second electric power is stopped, based on information indicating the presence or the absence of the supplies of the first electric power and the second electric power that have been respectively acquired from the operation monitoring unit and the drive monitoring unit.

* * * * *